(12) United States Patent
Huang

(10) Patent No.: US 7,434,714 B2
(45) Date of Patent: Oct. 14, 2008

(54) BIKE CARRYING RACK FOR AUTOMOBILE

(76) Inventor: Chin-Sung Huang, 152, Cai Liao Rd., Pi Jiao Village, Pu Xin Shiang, Changhua Hsien (TW)

( * ) Notice: Subject to any disclaimer, the term of this patent is extended or adjusted under 35 U.S.C. 154(b) by 711 days.

(21) Appl. No.: 11/062,390

(22) Filed: Feb. 22, 2005

(65) Prior Publication Data
US 2006/0186161 A1    Aug. 24, 2006

(51) Int. Cl.
*B60R 9/00*      (2006.01)
*B60R 11/00*     (2006.01)
(52) U.S. Cl. .................. 224/497; 224/314; 224/324; 224/493; 224/500
(58) Field of Classification Search .......... 224/497, 224/314, 924, 504, 505, 506; 476/31, 27, 476/34; 490/330, 230; 475/330, 230
See application file for complete search history.

(56) References Cited
U.S. PATENT DOCUMENTS

| | | | | | |
|---|---|---|---|---|---|
| 3,844,517 | A | * | 10/1974 | Fraser ................... | 248/188.3 |
| 4,452,385 | A | * | 6/1984 | Prosen ................... | 224/493 |
| 5,135,145 | A | * | 8/1992 | Hannes et al. .......... | 224/493 |
| 5,363,996 | A | * | 11/1994 | Raaber et al. ........... | 224/314 |
| 5,377,885 | A | * | 1/1995 | Wyers .................... | 224/493 |
| 5,505,357 | A | * | 4/1996 | Chimenti et al. ........ | 224/324 |
| 6,286,738 | B1 | * | 9/2001 | Robins et al. ........... | 224/314 |
| 6,772,927 | B2 | * | 8/2004 | Bogoslofski ........... | 224/324 |
| 2005/0258209 | A1 | * | 11/2005 | Wang .................... | 224/500 |

FOREIGN PATENT DOCUMENTS

EP    0827866 A2 * 11/1998
FR    2864810    * 1/2004

* cited by examiner

*Primary Examiner*—Nathan J Newhouse
*Assistant Examiner*—Lester L Vanterpool
(74) *Attorney, Agent, or Firm*—Alan Kamrath; Kamrath & Associates PA

(57) ABSTRACT

A bike carrying rack for an automobile includes a base frame, a support rack, and a pivot mechanism pivotally mounted between the base frame and the support rack and including two first rotation disks each provided with a first engaging face, and two second rotation disks each provided with a second engaging face detachably engaged with the first engaging face of the respective first rotation disk. Thus, the angle between the base frame and the support rack can be adjusted by the elastic effect of the base frame without needing to provide a spring, thereby simplifying the construction of the bike carrying rack.

15 Claims, 6 Drawing Sheets

BIKE CARRYING RACK FOR AUTOMOBILE

BACKGROUND OF THE INVENTION

1. Field of the Invention

The present invention relates to a bike carrying rack, and more particularly to a bike carrying rack for use with an automobile or the like.

2. Description of the Related Art

A bike carrying rack for an automobile comprises a first body, and a second body pivotally mounted on the first body. When the bike carrying rack is mounted on an automobile, the bicycle is supported by the first body of the bike carrying rack.

A conventional bike carrying rack in accordance with the prior art was disclosed in the Taiwanese Patent Publication No. 379685. However, the above-said conventional bike carrying rack needs to provide a spring to push the first rotation disk and the second rotation disk outward so that the support rack can be rotated relative to the base frame so as to adjust the angle between the base frame and the support rack, thereby complicating the construction of the bike carrying rack. In addition, the spring is easily worn out due to an elastic fatigue during a long-term utilization, thereby decreasing the lifetime of the bike carrying rack. Further, the first rotation disk and the second rotation disk are not waterproof and dustproof, thereby decreasing the engaging effect between the first rotation disk and the second rotation disk.

SUMMARY OF THE INVENTION

In accordance with the present invention, there is provided a bike carrying rack, comprising a base frame; a support rack mounted on the base frame; a pivot mechanism pivotally mounted between the base frame and the support rack and including two first rotation disks each having a first side provided with a first engaging face, and two second rotation disks each rotatably mounted on a respective one of the two first rotation disks and each having a first side provided with a second engaging face detachably engaged with the first engaging face of the respective first rotation disk.

The primary objective of the present invention is to provide a bike carrying rack having a simplified construction, thereby decreasing costs of fabrication.

Another objective of the present invention is to provide a bike carrying rack that is operated without use of a spring, so that the bike carrying rack has a simplified construction.

A further objective of the present invention is to provide a bike carrying rack having waterproof and dustproof effects.

A further objective of the present invention is to provide a bike carrying rack, wherein the angle between the base frame and the support rack can be adjusted by the elastic effect of the base frame without needing to provide a spring, thereby simplifying the construction of the bike carrying rack, and thereby enhancing the lifetime of the bike carrying rack.

A further objective of the present invention is to provide a bike carrying rack, wherein the O-ring is urged between the first engaging face of the respective first rotation disk and the second engaging face of the respective second rotation disk to provide waterproof and dustproof effects.

Further benefits and advantages of the present invention will become apparent after a careful reading of the detailed description with appropriate reference to the accompanying drawings.

DETAILED DESCRIPTION OF THE INVENTION

Figure 1:
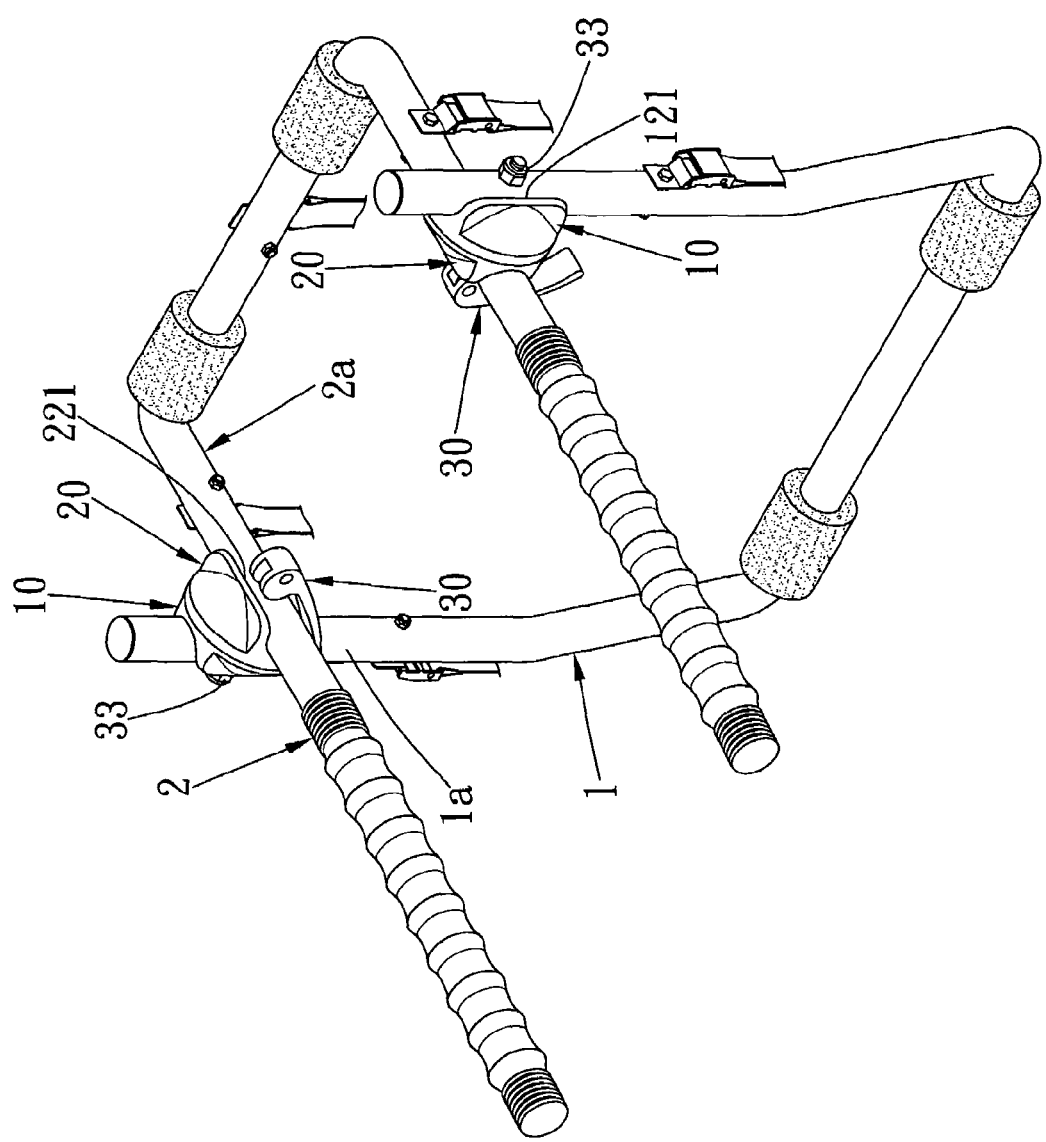
FIG. 1 is a perspective view of a bike carrying rack in accordance with the preferred embodiment of the present invention.
Figure 2:
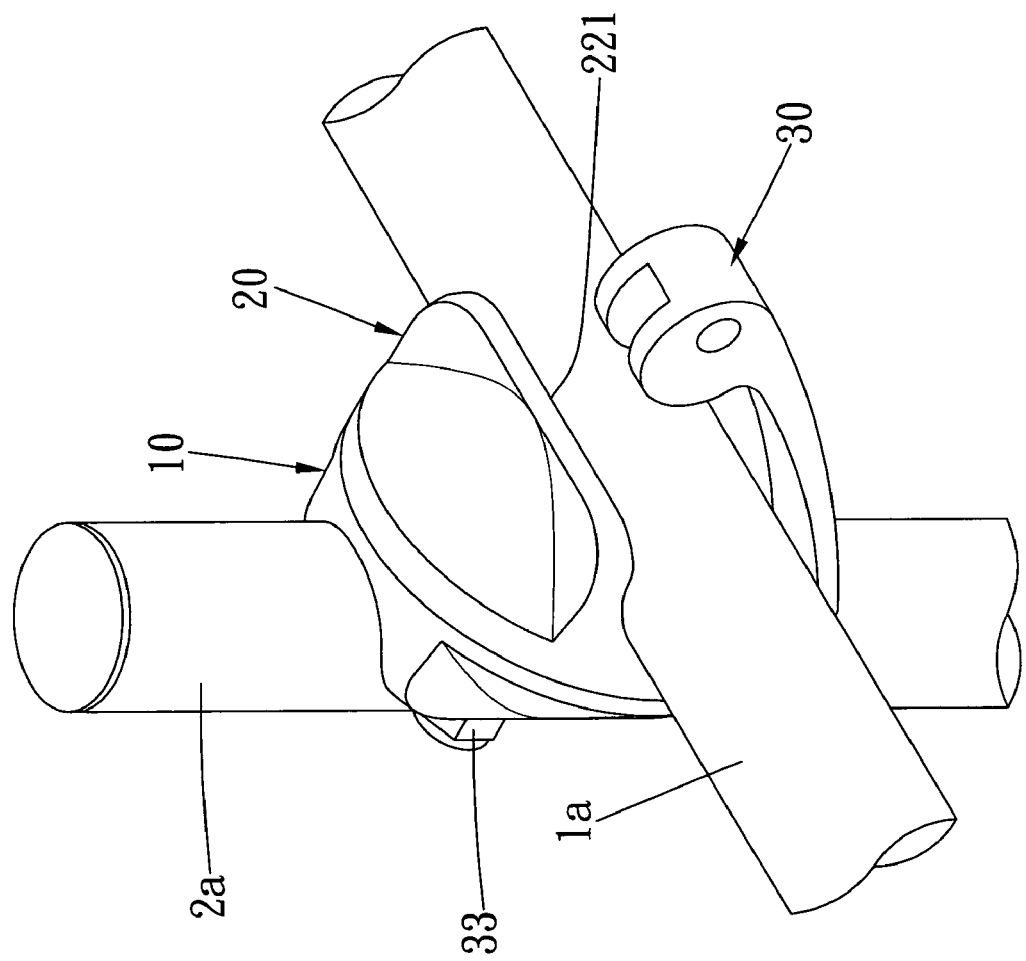
FIG. 2 is a partially perspective enlarged view of the bike carrying rack as shown in FIG. 1.
Figure 3:
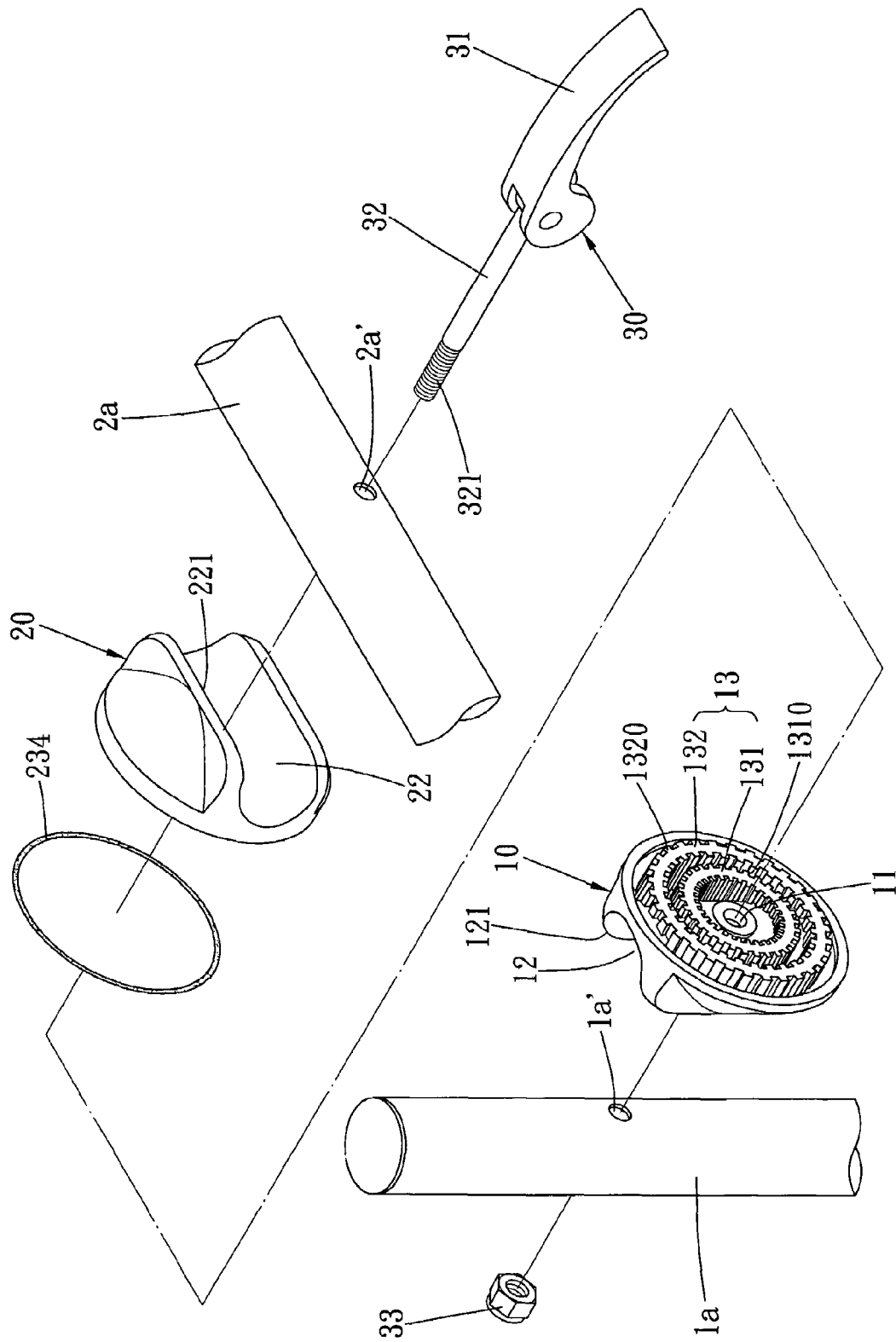
FIG. 3 is an exploded perspective enlarged view of the bike carrying rack as shown in FIG. 2.
Figure 5:
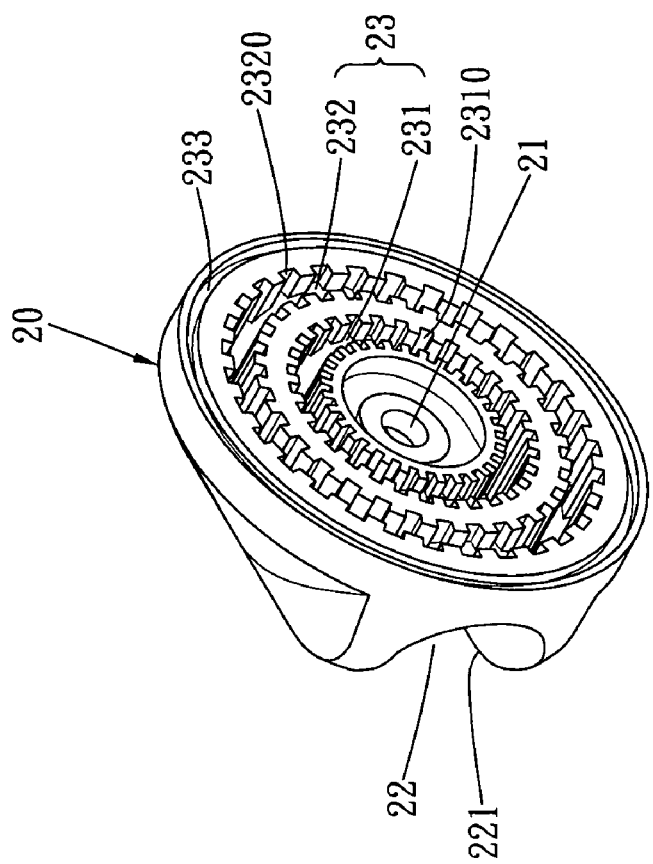
FIG. 5 is a perspective view of a second rotation disk of the bike carrying rack as shown in FIG. 2.
Figure 4:
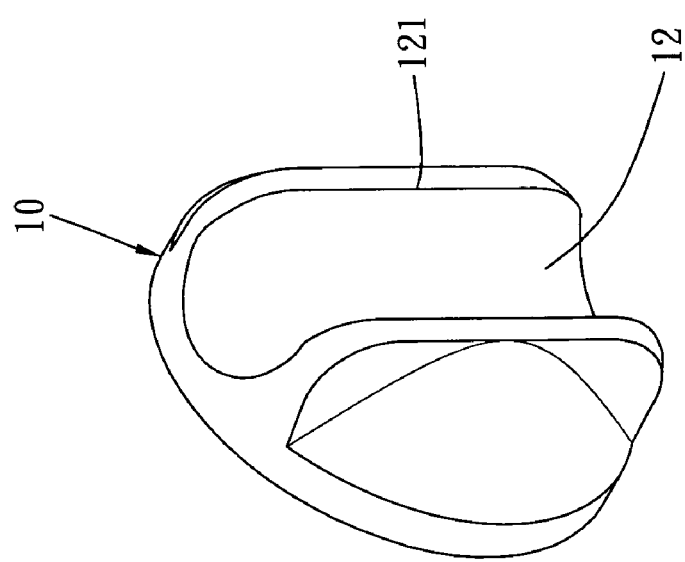
FIG. 4 is a perspective view of a first rotation disk of the bike carrying rack as shown in FIG. 2.

Referring to the drawings and initially to FIGS. 1-6, a bike carrying rack in accordance with the preferred embodiment of the present invention comprises a base frame 1, a support rack 2 mounted on the base frame 1, and a pivot mechanism pivotally mounted between the base frame 1 and the support rack 2 to adjust an angle between the base frame 1 and the support rack 2.

The base frame 1 is substantially U-shaped and has two side rods 1a each having a through hole 1a'. Preferably, the base frame 1 is elastic, so that the two side rods 1a of the base frame 1 are slightly expanded outward by an elastic effect of the base frame 1.

The support rack 2 is substantially U-shaped and has two support rods 2a each having a through hole 2a'.

The pivot mechanism is pivotally mounted between the two side rods 1a of the base frame 1 and the two support rods 2a of the support rack 2 and includes two first rotation disks 10 each having a first side provided with a first engaging face 13, two second rotation disks 20 each rotatably mounted on a respective one of the two first rotation disks 10 and each having a first side provided with a second engaging face 23 detachably engaged with the first engaging face 13 of the respective first rotation disk 10, and two quick releases 30 to lock an unlock a respective one of the two first rotation disks 10 and a respective one of the two second rotation disks 20.

The first engaging face 13 of each of the two first rotation disks 10 is provided with an inner engaging ring 131 and an outer engaging ring 132. The inner engaging ring 131 has an inner wall and an outer wall provided with a plurality of opposite rectangular protruding keys 1310, and the outer engaging ring 132 has an inner wall and an outer wall provided with a plurality of opposite rectangular protruding keys 1320. Each of the two first rotation disks 10 has a central portion formed with a through hole 11. Each of the two first rotation disks 10 is mounted on a respective one of the two side rods 1a of the base frame 1 and has a second side formed with a substantially arc-shaped mounting recess 12 for mounting the respective side rod 1a of the base frame 1. The mounting recess 12 of each of the two first rotation disks 10 is provided with two opposite retaining flanges 121 for retaining the respective side rod 1a of the base frame 1.

The second engaging face 23 of each of the two second rotation disks 20 is provided with an inner engaging groove 231 engaged with the inner engaging ring 131 of the first engaging face 13 of the respective first rotation disk 10 and an outer engaging groove 232 engaged with the outer engaging ring 132 of the first engaging face 13 of the respective first rotation disk 10. The inner engaging groove 231 has an annular shape and has an inner wall and an outer wall provided with a plurality of opposite rectangular keyways 2310, and the outer engaging groove 232 has an annular shape and has an inner wall and an outer wall provided with a plurality of opposite rectangular keyways 2320. Each of the two second rotation disks 20 has a central portion formed with a through hole 21. Each of the two second rotation disks 20 is mounted on a respective one of the two support rods 2a of the support rack 2 and has a second side formed with a substantially arc-shaped mounting recess 22 for mounting the respective support rod 2a of the support rack 2. The mounting recess 22 of each of the two second rotation disks 20 is provided with two opposite retaining flanges 221 for retaining the respective support rod 2a of the support rack 2. Each of the two second rotation disks 20 has a periphery formed with an annular retaining groove 233 for retaining an O-ring 234 which is urged between the first engaging face 13 of the respective first rotation disk 10 and the second engaging face 23 of the respective second rotation disk 20 to provide waterproof and dustproof effects.

Each of the two quick releases 30 includes a pivot shaft 32 in turn extended through the through hole 2a' of a respective one of the two support rods 2a of the support rack 2, the through hole 21 of the respective second rotation disk 20, the through hole 11 of the respective first rotation disk 10 and the through hole 1a' of a respective one of the two side rods 1a of the base frame 1 and having a first end provided with an eccentrically arranged drive handle 31 pivotally pressed on the respective support rod 2a of the support rack 2 and a second end formed with an outer thread 321, and a locking nut 33 screwed onto the outer thread 321 of the pivot shaft 32 and pressed on the respective side rod 1a of the base frame 1.

Figure 6:
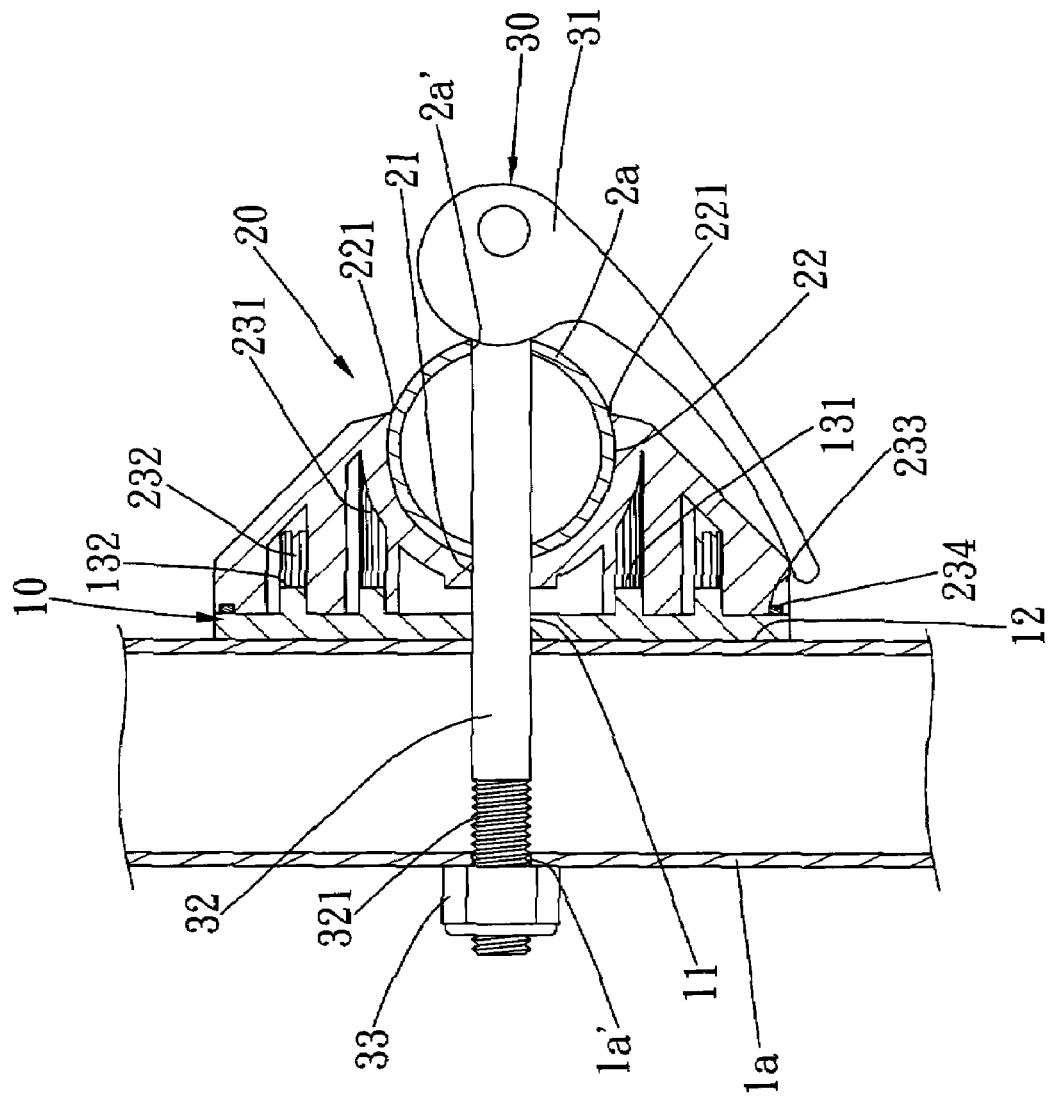
FIG. 6 is a plan cross-sectional view of the bike carrying rack as shown in FIG. 2.

As shown in FIG. 6, when the drive handle 31 of each of the two quick releases 30 is pressed on the respective support rod 2a of the support rack 2, the two side rods 1a of the base frame 1 are compressed to move inward, and each of the two first rotation disks 10 and the respective second rotation disk 20 are forced to move toward each other, so that the inner engaging ring 131 and the outer engaging ring 132 of the first engaging face 13 of each of the two first rotation disks 10 are respectively engaged with the inner engaging groove 231 and the outer engaging groove 232 of the second engaging face 23 of the respective second rotation disk 20. Thus, each of the two first rotation disks 10 and the respective second rotation disk 20 are locked with each other so that the support rack 2 is fixed on and cannot be rotated relative to the base frame 1. At this time, the O-ring 234 is urged between the first engaging face 13 of the respective first rotation disk 10 and the second engaging face 23 of the respective second rotation disk 20 to provide waterproof and dustproof effects.

Figure 7:
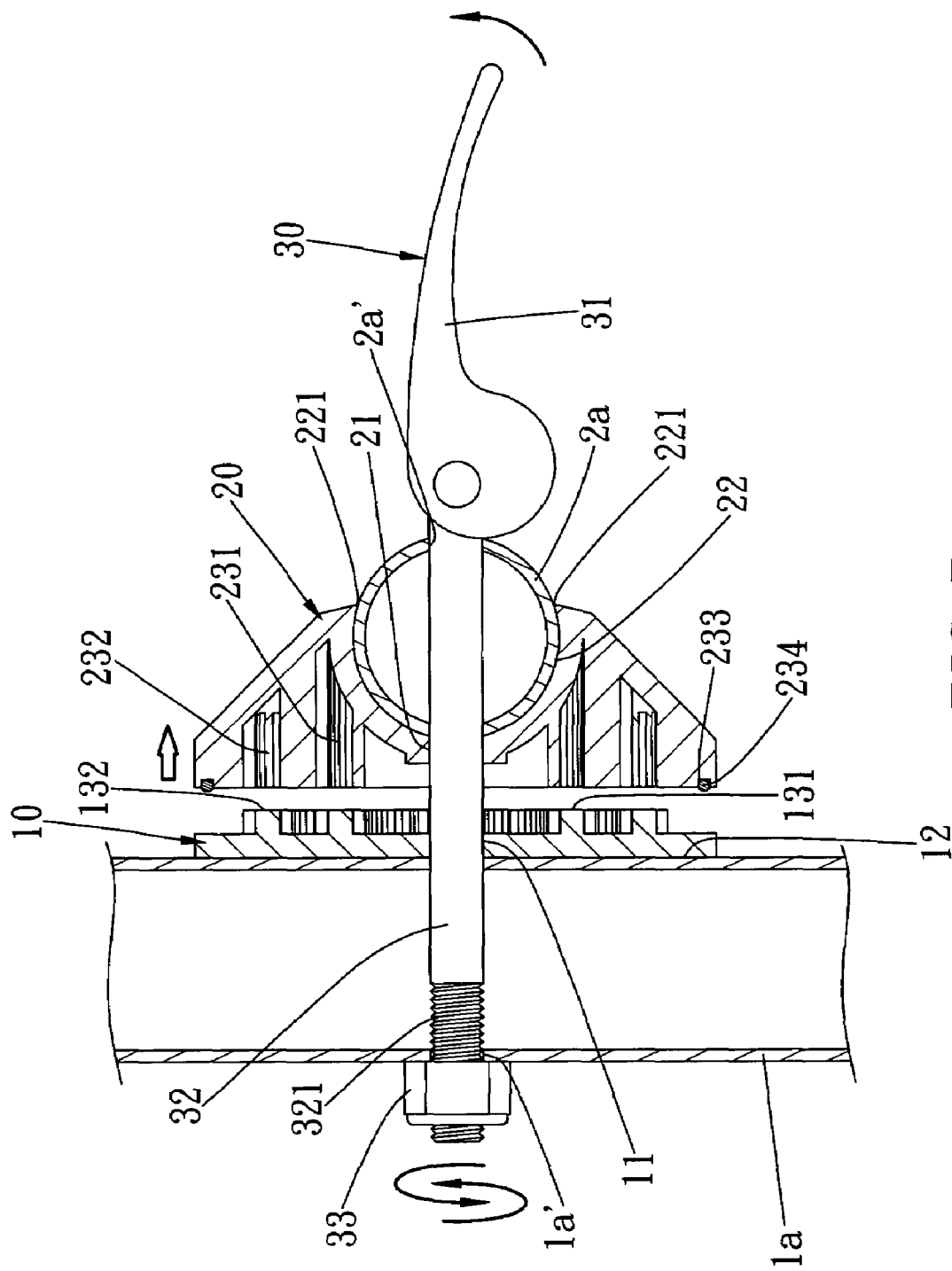
FIG. 7 is a schematic operational view of the bike carrying rack as shown in FIG. 6.

As shown in FIG. 7, when the drive handle 31 of each of the two quick releases 30 is pivoted to release the respective support rod 2a of the support rack 2, the two side rods 1a of the base frame 1 are expanded outward by the elastic effect of the base frame 1 to drive each of the two first rotation disks 10 to move outward relative to the respective second rotation disk 20, so that the inner engaging ring 131 and the outer engaging ring 132 of the first engaging face 13 of each of the two first rotation disks 10 are respectively disengaged from the inner engaging groove 231 and the outer engaging groove 232 of the second engaging face 23 of the respective second rotation disk 20. Thus, each of the two first rotation disks 10 and the respective second rotation disk 20 are separated from each other so that the support rack 2 can be rotated relative to the base frame 1. In such a manner, the support rack 2 and the second rotation disks 20 can be rotated about the pivot shaft 32 of each of the two quick releases 30 to move relative to the base frame 1 so as to adjust the angle between the base frame 1 and the support rack 2.

Accordingly, the angle between the base frame 1 and the support rack 2 can be adjusted by the elastic effect of the base frame 1 without needing to provide a spring, thereby simplifying the construction of the bike carrying rack, and thereby enhancing the lifetime of the bike carrying rack. In addition, the O-ring 234 is urged between the first engaging face 13 of the respective first rotation disk 10 and the second engaging face 23 of the respective second rotation disk 20 to provide waterproof and dustproof effects.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bike carrying rack, comprising:
a base frame;
a support rack mounted on the base frame;
a pivot mechanism pivotally mounted between the base frame and the support rack and including two first rotation disks each having a first side provided with a first engaging face, and two second rotation disks each rotatably mounted on a respective one of the two first rotation disks and each having a first side provided with a second engaging face detachably engaged with the first engaging face of the respective first rotation disk;
wherein the base frame has two side rods, the support rack has two support rods, each of the two first rotation disks is mounted on a respective one of the two side rods of the base frame and has a second side formed with a mounting recess for mounting the respective side rod of the base frame, and each of the two second rotation disks is mounted on a respective one of the two support rods of the support rack and has a second side formed with a mounting recess for mounting the respective support rod of the support rack;
each of the two side rods of the base frame has a through hole, each of the two support rods of the support rack has a through hole, each of the two first rotation disks has a central portion formed with a through hole, each of the two second rotation disks has a central portion formed with a through hole, and the pivot mechanism further includes two quick releases each including a pivot shaft in turn extended through the through hole of a respective one of the two support rods of the support rack, the through hole of a respective one of the two second rotation disks, the through hole of a respective one of the two first rotation disks and the through hole of a respective one of the two side rods of the base frame and having a first end provided with an eccentrically arranged drive handle pivotally pressed on the respective support rod of the support rack and a second end formed with an outer thread, and a locking nut screwed onto the outer thread of the pivot shaft and pressed on the respective side rod of the base frame.

2. The bike carrying rack in accordance with claim 1, wherein the first engaging face of each of the two first rotation disks is provided with an inner engaging ring and an outer engaging ring, and the second engaging face of each of the two second rotation disks is provided with an inner engaging groove engaged with the inner engaging ring of the first engaging face of the respective first rotation disk and an outer engaging groove engaged with the outer engaging ring of the first engaging face of the respective first rotation disk.

3. The bike carrying rack in accordance with claim 2, wherein the inner engaging ring has an inner wall and an outer wall provided with a plurality of opposite rectangular protruding keys, and the inner engaging groove has an inner wall and an outer wall provided with a plurality of opposite rectangular keyways.

4. The bike carrying rack in accordance with claim 2, wherein the inner engaging groove has an annular shape.

5. The bike carrying rack in accordance with claim 2, wherein the outer engaging ring has an inner wall and an outer wall provided with a plurality of opposite rectangular protruding keys, and the outer engaging groove has an inner wall and an outer wall provided with a plurality of opposite rectangular keyways.

6. The bike carrying rack in accordance with claim 2, wherein the outer engaging groove has an annular shape.

7. The bike carrying rack in accordance with claim 1, wherein the base frame is substantially U-shaped.

8. The bike carrying rack in accordance with claim 1, wherein the support rack is substantially U-shaped.

9. The bike carrying rack in accordance with claim 1, wherein the mounting recess of each of the two first rotation disks is substantially arc-shaped.

10. The bike carrying rack in accordance with claim 1, wherein the mounting recess of each of the two first rotation disks is provided with two opposite retaining flanges for retaining the respective side rod of the base frame.

11. The bike carrying rack in accordance with claim 1, wherein the mounting recess of each of the two second rotation disks is substantially arc-shaped.

12. The bike carrying rack in accordance with claim 1, wherein the mounting recess of each of the two second rotation disks is provided with two opposite retaining flanges for retaining the respective support rod of the support rack.

13. The bike carrying rack in accordance with claim 1, wherein when the drive handle of each of the two quick releases is pressed on the respective support rod of the support rack, the two side rods of the base frame are compressed to move inward, and each of the two first rotation disks and the respective second rotation disk are forced to move toward each other, so that the first engaging face of each of the two first rotation disks is engaged with the second engaging face of the respective second rotation disk.

14. The bike carrying rack in accordance with claim 1, wherein when the drive handle of each of the two quick releases is pivoted to release the respective support rod of the support rack, the two side rods of the base frame are expanded outward by an elastic effect of the base frame to drive each of the two first rotation disks to move outward relative to the respective second rotation disk, so that the first engaging face of each of the two first rotation disks is disengaged from the second engaging face of the respective second rotation disk.

15. The bike carrying rack in accordance with claim 1, wherein each of the two second rotation disks has a periphery formed with an annular retaining groove for retaining an O-ring which is urged between the first engaging face of the respective first rotation disk and the second engaging face of the respective second rotation disk.

* * * * *